(12) United States Patent
Seelig et al.

(10) Patent No.: US 9,365,125 B2
(45) Date of Patent: Jun. 14, 2016

(54) PLUG CONNECTOR

(71) Applicant: Phoenix Contact GMBH & CO. KG., Blomberg (DE)

(72) Inventors: Marco Seelig, Leopoldshöhe (DE); Ralf Feldner, Detmold, DE (US)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 14/372,434

(22) PCT Filed: Mar. 1, 2013

(86) PCT No.: PCT/EP2013/054188
§ 371 (c)(1),
(2) Date: Jul. 15, 2014

(87) PCT Pub. No.: WO2013/128005
PCT Pub. Date: Sep. 6, 2013

(65) Prior Publication Data
US 2015/0004827 A1 Jan. 1, 2015

(30) Foreign Application Priority Data
Mar. 1, 2012 (DE) .......................... 10 2012 101 690

(51) Int. Cl.
| B60L 11/18 | (2006.01) |
| H01R 13/62 | (2006.01) |
| H01R 13/629 | (2006.01) |
| H01R 13/639 | (2006.01) |
| H01R 13/73 | (2006.01) |
| H01R 13/502 | (2006.01) |

(52) U.S. Cl.
CPC .......... *B60L 11/1818* (2013.01); *H01R 13/502* (2013.01); *H01R 13/62* (2013.01);
(Continued)

(58) Field of Classification Search
CPC .... H01R 13/62; H01R 13/629; H01R 13/639; H02G 3/10; B60L 11/1818
USPC ........................................... 439/345, 39, 638
See application file for complete search history.

(56) References Cited

U.S. PATENT DOCUMENTS

| 7,950,943 B2 | 5/2011 | Ohtomo |
| 2011/0130021 A1 | 6/2011 | Suzuki et al. |

(Continued)

FOREIGN PATENT DOCUMENTS

| CN | 102082347 A | 6/2011 |
| DE | 102009021720 A1 | 11/2009 |

(Continued)

OTHER PUBLICATIONS

Schletter GMBH, DE 20 2010 014 351 U1, Jan. 24, 2012, Machine Translation.*

(Continued)

*Primary Examiner* — Amy Cohen Johnson
*Assistant Examiner* — Oscar C Jimenez
(74) *Attorney, Agent, or Firm* — Knobbe, Martens, Olson & Bear LLP

(57) ABSTRACT

The invention relates to a plug connector for electrically connecting an electric vehicle to a charging device, comprising a pug or a socket (1) and an electromechanically driven locking device (3), wherein the plug or the socket (1) is configured for establishing an electrical connection to a second socket or a second plug of a second plug connector associated with the electric vehicle or the charging device, the locking device (3) is movable axially to the plug-in direction (7) of the plug or socket (1) to mechanically lock and/or unlock an interconnected plug/socket pair (1), and the locking device (3) and/or the plug or the socket (1) has a centering device (11) configured in such a way that the locking device (3) can be detachably fastened in a form-fitting manner to the plug or to the socket (1) in a position predetermined by the centering device (11). A significantly simplified assembly is thus made possible, even where space is restricted.

20 Claims, 4 Drawing Sheets

Figure 1:
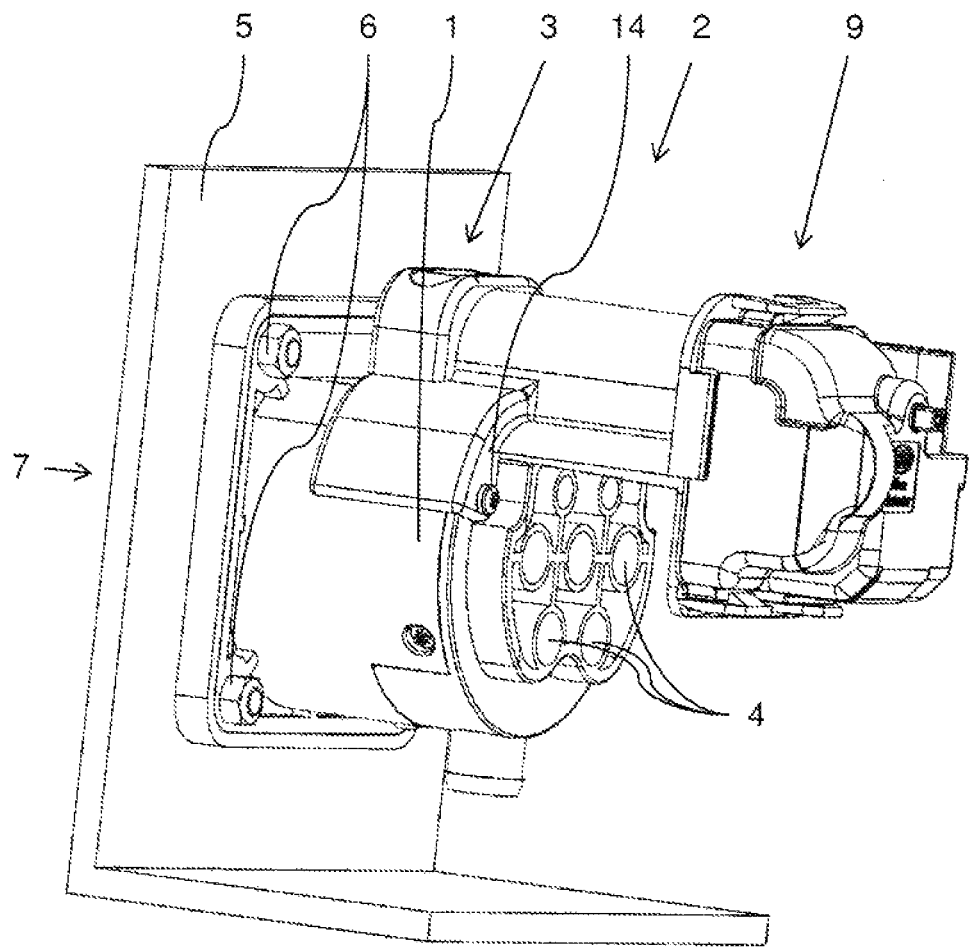

(52) U.S. Cl.
CPC ......... *H01R 13/629* (2013.01); *H01R 13/6397* (2013.01); *H01R 13/73* (2013.01); *B60L 2270/32* (2013.01); *B60L 2270/34* (2013.01); *H01R 2201/26* (2013.01); *Y02T 10/7005* (2013.01); *Y02T 10/7072* (2013.01); *Y02T 90/14* (2013.01)

(56) References Cited

U.S. PATENT DOCUMENTS

2012/0071017 A1* 3/2012 Gaul et al. .................... 439/304
2014/0187076 A1* 7/2014 Fuhrer .......................... 439/345

FOREIGN PATENT DOCUMENTS

DE 102009057426 A1 6/2011
DE 202010014351 U1 3/2012
WO WO 2012159950 A1 * 11/2012

OTHER PUBLICATIONS

Office Action received in German counterpart application No. 10-2012-1016909, dated Nov. 14, 2012, 6 pgs.
Office Action dated Jan. 11, 2016, in related Chinese Patent Application No. 201380010243.7 (5 pgs.), as well as English language translation thereof (5 pgs.); 10 pages, total.

* cited by examiner

PLUG CONNECTOR

CROSS-REFERENCE TO RELATED APPLICATION(S)

This application is a U.S. National Stage Application of International Application No. PCT/EP2013054188 filed Mar. 1, 2013, published as WO2013/28005A1, which claims priority from German Patent Application Nos. 10 2012 01 690.9, filed Mar. 1, 2012, which are incorporated herein by reference in entirety.

The invention relates to a plug connector for electrically connecting an electric vehicle to a charging device, comprising a plug or a socket and an electrically driven locking device, wherein the plug or the socket is configured for establishing an electrical connection to a second socket or a second plug of a second plug connector associated with the electric vehicle or the charging device.

In the field of E-mobility applications, plug connectors with electrical locking are known and standardised for transferring electrical energy from the charging device to charge a vehicle battery provided in the electric vehicle. To this end, an appliance plug can be provided on the charging device and/or on the electric vehicle, such that an electrical connection can be produced between the charging device and the electric vehicle by means of a connection cable, which at both ends has a cable plug corresponding to the appliance plug. The appliance plug and the cable plug can be configured as a plug or socket, wherein the cable plug is often configured as a plug, that is to say with male contacts, and the appliance plug is often configured as a socket, that is to say with female contacts.

This electrical locking can allow far a mechanical insertion of a cylindrical pin perpendicularly to the plug-in direct on of the plug connector plugged fully as far as a stop, wherein, the appliance plug and the cable plug can be penetrated in a radial direction by the cylindrical pin via corresponding bores or contours, such that with locking, a form-fitting connection is produced in the axial direction. A manual detachment of the connected plug, connector is thus prevented, so that for safety reasons, plug connectors under electrical load cannot be separated from one another or an incomplete charging of the vehicle battery cannot be interrupted. The cylindrical pin is generally driven electromechanically, for example via solenoids or actuators with upstream mechanics.

If only one appliance plug is inserted into the opening in a wall, for example of an electric vehicle or a charging device, this is to occur in many cases from the rear side of the wall, since the drive of the cylindrical pin, in particular when the cylindrical pin can be inserted perpendicularly to the plug-in direction of the plug connector, "protrudes" laterally from the plug connector, such that it is made impossible for the plug connector, including the drive of the cylindrical pin, to pass through the opening from the front side of the wall. This means that a subsequent mounting of such an appliance plug is ruled out in almost all cases, in particular if it is not possible to attach the appliance plug to the wall on the rear side due to restricted space.

The object of the invention is therefore to specify a plug connector for electrically connecting an electric vehicle to an electromechanically operated cylindrical pin for locking a plug/socket pair, which plug connector can also be mounted subsequently in a wall and where space is restricted.

The object is achieved in accordance with the invention by the features of the independent claims. Advantageous embodiments of the invention are specified in the dependent claims.

The object of the invention is therefore solved by a plug connector for electrically connecting an electric vehicle to a charging device, comprising a plug or a socket and an electromechanically driven locking device, wherein the plug or the socket is configured for establishing an electrical connection to a second socket or a second plug of a second plug connector associated with the electric vehicle or the charging device, the locking device is movable axially to the plug-in direction of the plug or the socket to mechanically lock and/or unlock a interconnected plug/socket pair, and the locking device and/or the plug or the socket has a centering device configured in such a way that the locking device can be detachably fastened in a form-fitting manner to the plug or to the socket in a position predetermined by the centering device.

It is thus a key point of the invention that the plug connector is formed in two parts, specifically on the one and comprises the plug or the socket and on the other hand comprises the locking device, wherein the locking device can be detachably fastened to the plug or to the socket. This thus means that the plug connector can also be inserted subsequently, in poor light and/or where space is restricted, into an opening in a wall of an electric vehicle and/or a charging device, for example in a first step the plug or the socket can thus be inserted from the "outer face" of the wall into the opening and in a second step the locking device can then be fastened from the inner faces of the wall to the plug or to the socket already inserted into the wall.

Since, due to the provision of the centering device, the locking device can be fastened to the plug or to the socket in a form-fitting manner in a predetermined position, the joining together of these parts is simplified significantly. Specifically, this means that the locking device, which is movable axially to the plug-in direction of the plug or the socket for mechanical locking of a plug/socket pair, comes to rest against the plug or against the socket in a predetermined position due to the centering device, that is to say for example, in the embodiment of a cylindrical pin for mechanical locking, can run into a contour of the plug or of the socket axially to the plug-in direction of the plug/socket pair. In other words, this means that, due to the embodiment with the cantering device, the locking device can be joined in an accurately fitting manner to the plug or the socket in the predetermined position, that is to say an operator can thus join the locking device to the plug or socket almost blindly.

In principle, the plug and/or the socket can be configured as any means known from the prior art for producing an electrical connection between the plug connectors, for example as a cable plug and/or appliance plug. Both the plug and the socket preferably have a plurality of electric contacts, wherein the plug is particularly preferably configured with male contacts and the socket is particularly preferably configured with female contacts corresponding thereto. The plug connector may also be used with any electric vehicle and any charging device known from the prior art.

As will be discussed in greater detail further below, the locking means can be configured for example as a cylindrical pin or as a bolt, wherein the cylindrical pin bolt is movable axially to the plug-in direction of the plug or the socket to mechanically lock and/or unlock an interconnected plug/socket pair. The plug and the socket particularly preferably have a respective contour or opening corresponding to the locking device, such that the locking device, in its closed position, preferably passes through both respective contours or openings of the plug and the socket, such that the interconnected plug/socket pair is thus mechanically locked. Accordingly, the locking device in its open position is not engaged with the aforementioned contour or opening of the second socket or of the second plug, such that the second socket or the second plug can be removed from the plug or the socket respectively.

There are also various possibilities for forming the centering device, for example via a contour provided on the locking device with a mating contour provided accordingly on the plug or on the socket, as is described hereinafter in greater detail. In any case, it is preferable that an unambiguous, predetermined position is achieved as a result of the centering device when joining the locking device to the plug or the socket, wherein the predetermined position preferably forms at least one form-fitting connection in the radial direction relative to the plug-in direction of the plug or the socket, most preferably also forms an axial form-fitting connection axially to the plug-in direction of the plug or the socket, here most preferably in the direction of the second socket or of the second plug, that is to say preferably in the "direction of removal" of a plug from a corresponding socket.

In accordance with a further preferred embodiment of the invention, the centering device is configured in such a way that the predetermined position can be reached by fastening the locking device to the Plug or to the socket by means of a first movement of the locking device in a radial direction relative to the plug-in direction of the plug or socket and by means of a second movement in an axial direction relative to the plug-in direction of the plug or the socket. In other words, the centering device is preferably configured in such a way that, when advancing the locking device "from behind" towards the plug or towards the socket and then "lowering" the locking device, that is to say by the first movement in a radial direction, and subsequent "sliding forwards", that is to say by the second movement in an axial direction, the predetermined position can be reached, in which the locking device is connected in a form-fitting manner to the plug or the socket or the locking device is fastened in a form-fitting manner to the plug or to the socket. Due to such an embodiment, the locking device can thus be fastened particularly easily to the plug or to the socket, even in poor light and/or where space is restricted, such that, to lock an interconnected plug/socket pair, the locking device can be moved in the predetermined or defined position axially to the plug-in direction of the plug or the socket.

In principle, the locking device can be configured arbitrarily, wherein the locking device is most preferably configured as a bolt or as a cylindrical pin. In accordance with a further preferred embodiment of the invention, the plug or the socket has an opening for the insertion of the bolt, the opening and the bolt have a diameter of substantially equal size, and the bolt, in the predetermined position, is arranged relative to the plug or to the socket in such a way that the bolt can be inserted into the opening axially to the plug-in direction of the plug or the socket to mechanically lock an interconnected plug/socket pair.

In accordance with a further preferred embodiment of the invention, the plug connector has a drive device for the locking device, wherein the drive device comprises the locking device, the centering device is configured in two parts on the drive device and on the plug or on the socket, and the first part of the centering device provided on the drive device has a projection extending semi-circularly in an axial direction relative to the plug-in direction of the plug or the socket, and the second part of the centering device provided on the plug or on the socket has a semi-circularly extending groove for receiving the projection in a form-fitting manner. Alternatively, the first part of the centering device may have a contour and the second part of the centering device may have a mating contour for receiving the contour in a form-fitting manner. In any case, in accordance with this embodiment, the centering device is arranged with a first part on the drive device and is arranged with a second part on the plug or on the socket, such that the first part and the second part of the centering device cooperate in such a way that, by joining the drive device or the locking device to the plug or the socket, the locking device and the plug or the socket assume the predetermined position.

In accordance with yet a further preferred embodiment of the invention, the drive device has a fastening means for fixing the drive device fastened to the plug or to the socket. Here, it is also preferable that the fastening means is configured as a screw, for example as a self-cutting screw, which can be preassembled on the drive device, such that, once the drive device has been joined to the plug or the socket and once the predefined position has been reached, the drive device is fixed, preferably permanently fixed, to the plug or to the socket by the fastening means. A "tilting" of the drive device relative to the plug or to the socket can thus be prevented, such that an even more reliable operation of the drive device or of the locking device can be ensured.

In principle, the electromechanical actuation of the locking device can be performed by any means known from the prior art, wherein, however, it is particularly preferable that the drive device has an actuator, actuatable by an electric pulse, for locking and/or unlocking an interconnected plug/socket pair. To provide the electric pulse, an energy source or other means can be provided, for example a battery, a capacitor and/or a coil. In addition, the energy source may be chargeable by the charging device and/or a vehicle battery associated with the electric vehicle.

In accordance with a further preferred embodiment, the plug connector is configured to be fastened in an opening in a wall in such a way that the plug or the socket can be inserted into the opening from one side of the wall only if the locking device is not fastened to the plug or to the socket, and the locking device can be fastened from the other side of the wall to the plug or socket inserted into the opening. It is therefore thus preferable that the plug connector cannot be fastened "as a whole" to the wall, but is configured in such a way that the plug or the socket is always to be inserted first into the opening in a wall and the locking device is then connected in a second step, preferably from the other side of the wall, to the plug or the socket already inserted into the wall. A "tilting" is thus avoided as a result of the form-fitting connection between the plug or the socket and the locking device achieved by means of the centering device, such that a reliable and secure actuation of the locking device to lock an interconnected plug/socket pair is possible. Within the scope of this invention, "interconnected" means that the two plug connectors provide an electrical connection between the electric vehicle and the charging device and for this purpose preferably have a form-fitting and/or force-fitting connection between their plugs and sockets respectively.

The object of the invention is also achieved by a plug connection arrangement comprising a plug connector, as already specified, and a second plug connector, wherein the second plug connector preferably has a second socket or a second plug, which is configured correspondingly in order to produce an electrical connection to the plug or socket respectively. In addition, the object of the invention is achieved by a charging device or an electric vehicle comprising a plug connector as specified above.

The invention will be explained in greater detail hereinafter on the basis of a preferred embodiment with reference to the accompanying drawing.

Figure 2:
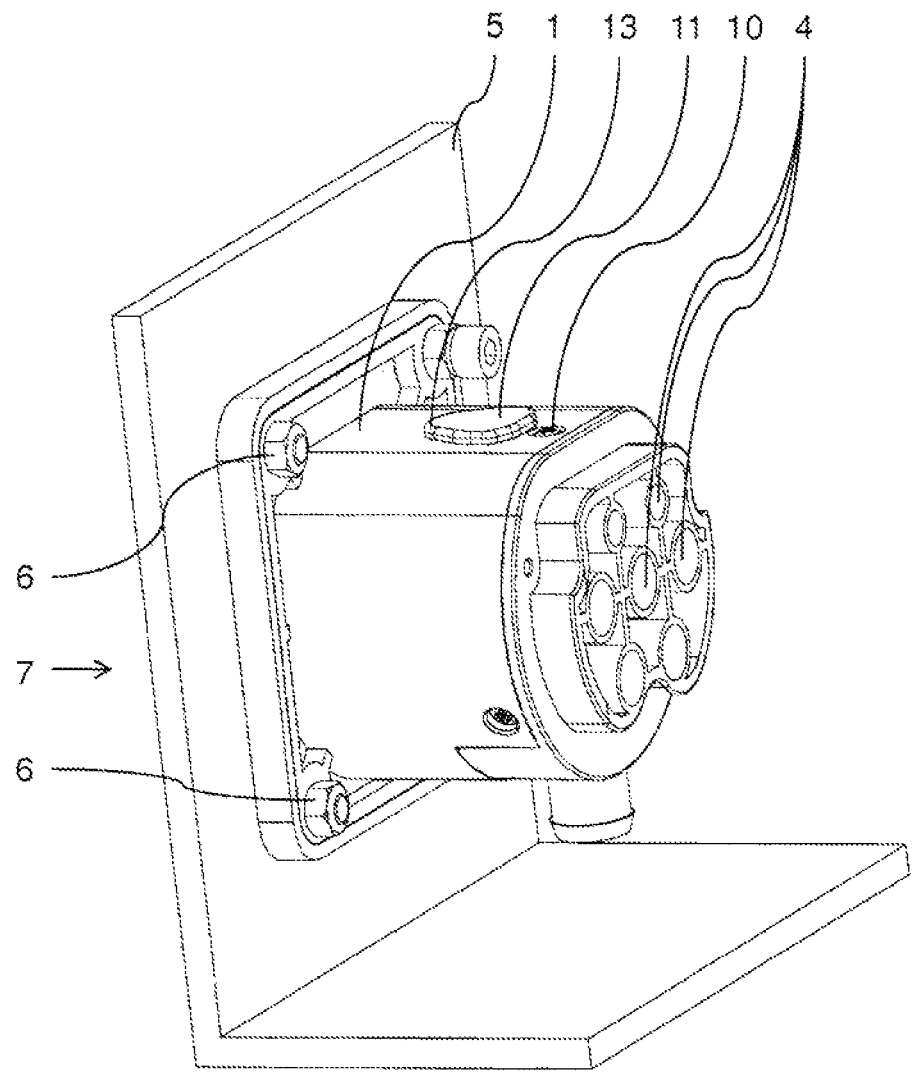
Figure 3:
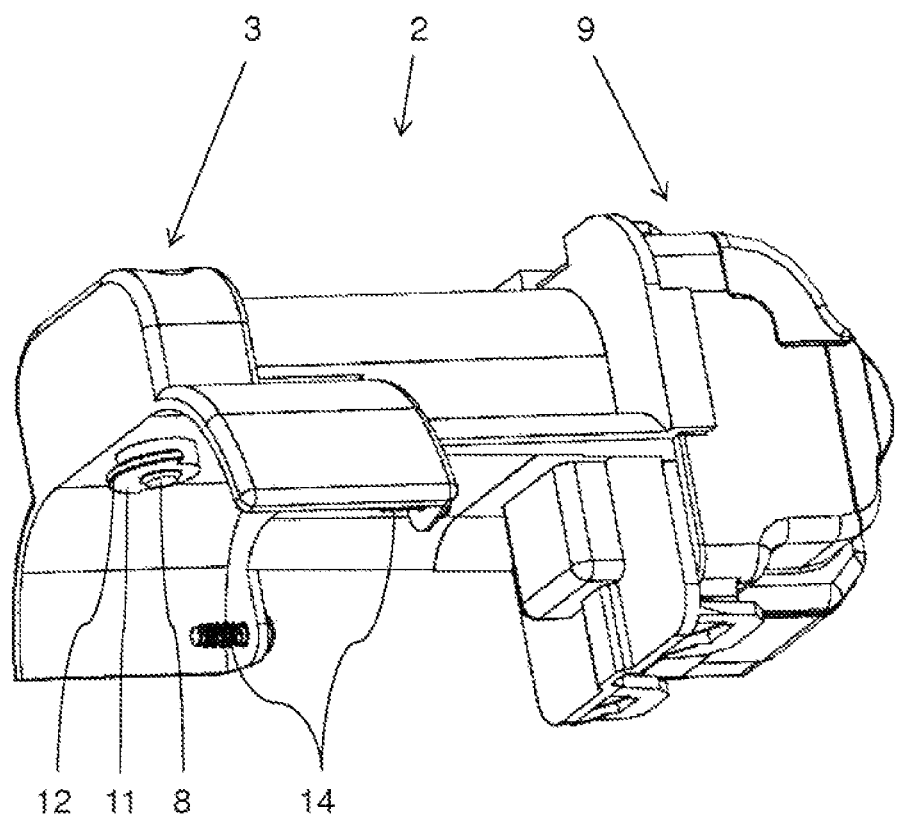
Figure 4:
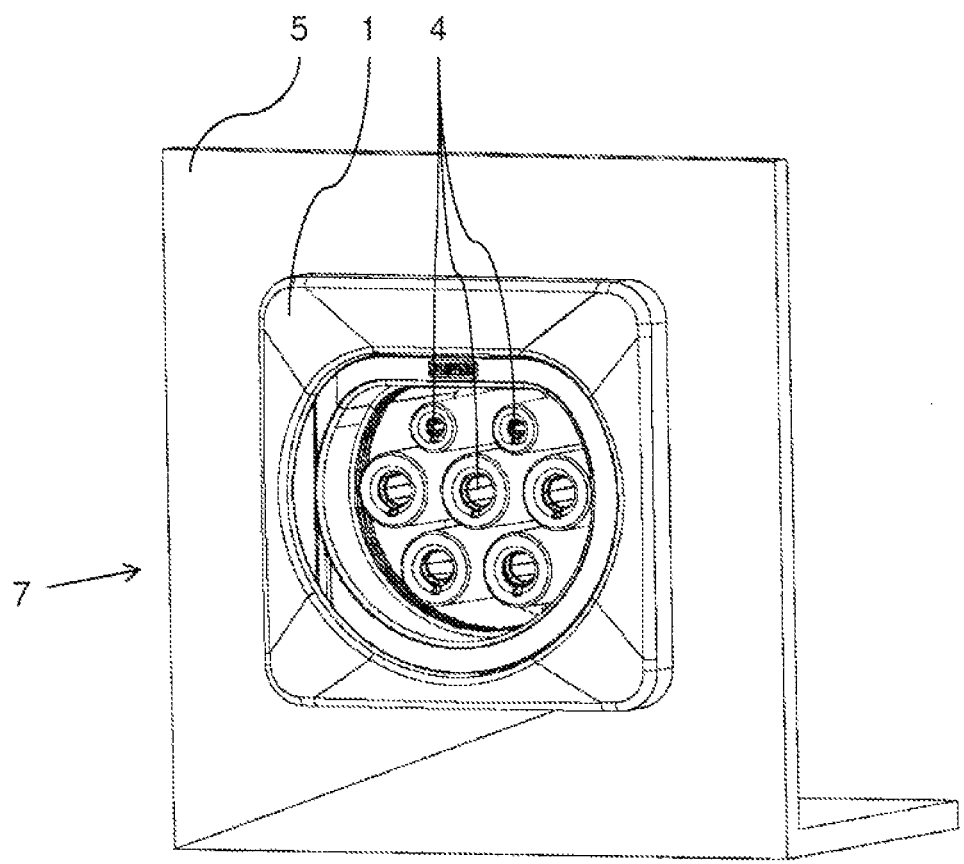

IN THE DRAWING:

FIG. 1 shows a plug connector comprising a socket and a drive device in accordance with a preferred embodiment of the invention, FIG. 2 shows the socket in accordance with the preferred embodiment of the invention, FIG. 3 shows the drive device in accordance with the preferred embodiment of the invention, and FIG. 4 shows a second view of the socket in accordance with the preferred embodiment of the invention.

FIG. 1 shows a plug connector for electrically connecting an electric vehicle to a charging device. The plug connector has a socket 1 and a drive device 2, wherein the drive device 2 comprises an electromechanically driven locking device 3. FIG. 2 shows the socket in isolation, whereas FIG. 3 shows the drive device 2. Lastly, FIG. 4 shows a further view of the socket 1.

The socket 1 has a plurality of electric contacts 4, which are configured to produce an electrical connection to a corresponding plug of a second plug connector associated with the electric vehicle or the charging device. The socket 1 is inserted into a wall 5, for example of the electric vehicle or the charging device, and is fastened to the wall 5 using screws 6.

The locking device 3 has a bolt 8, which is movable axially to the plug-in direction 7 of the socket and which is configured in the present case as a cylindrical pin. As shown in FIG. 3, the bolt 8 remains in this illustration in its open position, which is explained further below. To actuate the bolt 8, the drive device 2 has an actuator 9, which, actuated by an electric pulse, enables an interconnected plug/socket pair 1 to be locked and/or unlocked.

For this purpose, that is to say for locking, the bolt 8 is movable axially to the plug-in direction 7 of the socket 1, as already mentioned, and runs through an opening 10 to the centre line of the plug connector into the socket 1, such that a plug connected to the socket 1, said plug also having a further opening corresponding to the opening 10, is mechanically locked against detachment of the plug/socket pair 1 by the insertion of the bolt into the two openings 10.

In accordance with the invention, the drive device 2 and therefore also the locking device 3 can be fastened detachably to the socket 1. This has the great advantage that the socket 1 can be fastened firstly in the wall. 5 and then in a second step the drive device 2 can be fastened to the socket 1 in a particularly simple manner.

So that the bolt 8 of the drive device 2 can slide in an accurately fitting manner into the opening 10 in an actuator-operated manner in order to lock a plug/socket pair 1, the drive device 2 has to be fastened to the socket 1 in an accurately fitting manner. A centering device 11 is provided for this purpose, which is configured in two parts on the one hand on the socket 1 and also on the drive device 2.

As can be seen from FIG. 2 and FIG. 3, the centering device 11 on the drive device 2 has a projection 12 extending semi-circularly in an axial direction against the plug-in direction 7 of the socket 1, that is to say a contour that cooperates with a semi-circularly extending groove 13 provided on the socket 1, in such way that, when the socket 1 is connected to the drive device 2, the socket 1 and the drive device 2 enter into a form-fitting connection in a position predetermined by the centering device 11.

Specifically, this means that, as a result of the present embodiment of the centering device 11, shown in FIG. 2 and FIG. 3, the projection 12 is slid into the receptacle of the centering device 11, which is formed in the present case as a groove 13, by means of a first movement of the drive device 2 towards the socket 1, that is to say by a movement of the drive device 2 in a radial direction relative to the plug-in direction 7 of the socket 1, and by means of a second movement in an axial direction against the plug-in direction 7 of the socket 1, such that the predetermined position is thus reached in this position, the locking device 3 is then centred on the socket 1 in such a way that the bolt 8 can enter the opening 10.

To further fix the drive device 2 to the socket 1, self-cutting screws are provided as fastening means 14 and can be inserted into the socket 1 in a manner preassembled on the drive device 2 in the connected state of the drive device 2 and the socket 1.

LIST OF REFERENCE SIGNS socket 1
drive device 2
locking device 3
electric contacts 4
wall 5
screw 6
plug-in direction 7
bolt 8
actuator 9
opening 10
centering device 11
projection 12
groove 13
fastening means 14

The invention claimed is:

1. A plug connector for electrically connecting an electric vehicle to a charging device, the plug connector comprising:
    a plug or a socket;
    an electromechanically driven locking device; and
    a drive device for the locking device, wherein the drive device comprises the locking device;
    wherein:
    the plug or the socket is configured for establishing an electrical connection to a second socket or a second plug of a second plug connector associated with the electric vehicle or the charging device,
    the locking device comprises a bolt which is movable vertically along an axis in the plug-in direction of the plug or the socket to mechanically lock and/or unlock an interconnected plug/socket pair,
    the locking device and/or the plug or the socket has a centering device configured in such a way that the locking device can be detachably fastened in a form-fitting manner to the plug or to the socket in a position predetermined by the centering device,
    the centering device is configured in two parts with a first part on the drive device and a second part on the plug or on the socket,
    the first part of the centering device provided on the drive device has a projection extending semi-circularly in an axial direction relative to the plug-in direction of the plug or the socket, and
    the second part of the centering device provided on the plug or on the socket has a semi-circularly extending groove for receiving the projection in a form-fitting manner.

2. The plug connector according to claim 1, wherein the centering device is configured in such a way that the predetermined position can be reached by fastening the locking device to the plug or to the socket via a first movement of the locking device in a radial direction relative to the plug-in direction of the plug or socket and via a second movement in an axial direction relative to the plug-in direction of the plug or the socket.

3. The plug connector according claim 2, wherein the drive device has a fastening device for fixing the drive device fastened to the plug or to the socket.

4. The plug connector according to claim 2, wherein the plug connector is configured to be fastened in an opening in a wall in such a way that the plug or the socket can be inserted into the opening from one side of the wall only if the locking device is not fastened to the plug or to the socket, and the locking device can be fastened from the other side of the wall to the plug or to the socket inserted into the opening.

5. The plug connector according to claim 2, wherein the plug or the socket has an opening for the insertion of the bolt, the opening and the bolt have a diameter of substantially equal size, and the bolt, in the predetermined position, is arranged relative to the plug or to the socket in such a way that the bolt can be inserted into the opening axially to the plug-in direction of the plug or the socket to mechanically lock an interconnected plug/socket pair.

6. The plug connector according to claim 5, wherein the drive device has a fastening device for fixing the drive device fastened to the plug or to the socket.

7. The plug connector according to claim 6, wherein the drive device has an actuator actuatable by an electric pulse, for locking and/or unlocking an interconnected plug/socket pair.

8. The plug connector according to claim 1, wherein the plug or the socket has an opening for the insertion of the bolt, the opening and the bolt have a diameter of substantially equal size, and the bolt, in the predetermined position, is arranged relative to the plug or to the socket in such a way that the bolt can be inserted into the opening axially to the plug-in direction of the plug or the socket to mechanically lock an interconnected plug/socket pair.

9. The plug connector according to claim 1, wherein the drive device has a fastening device for fixing the drive device fastened to the plug or to the socket.

10. The plug connector according to claim 9 wherein the plug or the socket has an opening for the insertion of the bolt, the opening and the bolt have a diameter of substantially equal size, and the bolt, in the predetermined position, is arranged relative to the plug or to the socket in such a way that the bolt can be inserted into the opening axially to the plug-in direction of the plug or the socket to mechanically lock an interconnected plug/socket pair.

11. The plug connector according to claim 9, wherein the drive device has an actuator, actuatable by an electric pulse, for locking and/or unlocking an interconnected plug/socket pair.

12. The plug connector according to claim 11, wherein the plug connector is configured to be fastened in an opening in a wall in such a way that the plug or the socket can be inserted into the opening from one side of the wall only if the locking device is not fastened to the plug or to the socket, and the locking device can be fastened from the other side of the wall to the plug or to the socket inserted into the opening.

13. The plug connector according to claim 12, wherein the plug or the socket has an opening for the insertion of the bolt, the opening and the bolt have a diameter of substantially equal size, and the bolt, in the predetermined position, is arranged relative to the plug or to the socket in such a way that the bolt can be inserted into the opening axially to the plug-in direction of the plug or the socket to mechanically lock an interconnected plug/socket pair.

14. The plug connector according to claim 1, wherein the drive device has an actuator actuatable by an electric pulse, for locking and/or unlocking an interconnected plug/socket pair.

15. The plug connector according to claim 14, wherein the drive device has a fastening device for fixing the drive device fastened to the plug or to the socket.

16. The plug connector according to claim 1, wherein the plug connector is configured to be fastened in an opening in a wall in such a way that the plug or the socket can be inserted into the opening from one side of the wall only if the locking device is not fastened to the plug or to the socket, and the locking device can be fastened from the other side of the wall to the plug or to the socket inserted into the opening.

17. A plug connector arrangement comprising the plug connector according to claim 1 and comprising the second plug connector.

18. A charging device or electric vehicle comprising the plug connector according to claim 1.

19. The plug connector according to claim 1, wherein the centering device is configured in such a way that the predetermined position can be reached by fastening the locking device to the plug or to the socket via a radial movement of the locking device in a radial direction relative to the plug-in direction of the plug or socket.

20. The plug connector according to claim 1, wherein the centering device is configured in such a way that the predetermined position can be reached by fastening the locking device to the plug or to the socket via a axial movement in an axial direction relative to the plug-in direction of the plug or the socket.

* * * * *